(12) United States Patent
Carrouset

(10) Patent No.: US 8,397,385 B2
(45) Date of Patent: Mar. 19, 2013

(54) METHOD OF CONFIGURING HOLLOW HELICAL WHEELS AND THEIR CAGES

(76) Inventor: Pierre Carrouset, Paris (FR)

( * ) Notice: Subject to any disclaimer, the term of this patent is extended or adjusted under 35 U.S.C. 154(b) by 1092 days.

(21) Appl. No.: 12/374,820

(22) PCT Filed: Jul. 23, 2007

(86) PCT No.: PCT/FR2007/001267
§ 371 (c)(1),
(2), (4) Date: Jan. 23, 2009

(87) PCT Pub. No.: WO2008/012425
PCT Pub. Date: Jan. 31, 2008

(65) Prior Publication Data
US 2011/0203095 A1    Aug. 25, 2011

(30) Foreign Application Priority Data
Jul. 24, 2006   (FR) ...................... 06 06764

(51) Int. Cl.
*B21K 25/00*  (2006.01)
*B21P 15/02*  (2012.01)
*G06F 17/50*  (2006.01)
(52) U.S. Cl. .................. 29/889.2; 29/889.23; 29/889.6; 29/889.72; 415/72; 416/175; 416/176; 416/203; 703/1

(58) Field of Classification Search ............... 29/888, 29/888.02, 888.021, 888.022, 888.024, 888.025, 29/889, 889.2, 889.23, 889.3, 889.4, 889.5, 29/889.6, 889.61, 889.72, 889.721; 415/71, 415/72, 74, 75; 416/176, 177, 175, 203
See application file for complete search history.

(56) References Cited

U.S. PATENT DOCUMENTS

| 2,477,954 A | * | 8/1949 | Blanc ............................. 415/33 |
| 3,864,055 A | * | 2/1975 | Kletschka et al. ............... 415/1 |
| 3,957,389 A | * | 5/1976 | Rafferty et al. .................. 415/1 |
| 4,146,353 A | * | 3/1979 | Carrouset ..................... 416/176 |
| 4,365,931 A | * | 12/1982 | Dellacha ........................ 415/90 |
| 5,112,188 A | * | 5/1992 | Barnetche-Gonzalez . 415/198.1 |
| 5,139,391 A | * | 8/1992 | Carrouset ...................... 415/74 |
| 5,203,653 A | * | 4/1993 | Kudla .......................... 408/207 |
| 5,290,145 A | * | 3/1994 | Barnetche-Gonzales .. 415/198.1 |
| 5,425,616 A | * | 6/1995 | Arai et al. ..................... 414/680 |
| 6,393,331 B1 | * | 5/2002 | Chetta et al. ................... 700/97 |
| 2007/0248454 A1 | * | 10/2007 | Davis et al. .................... 415/74 |

* cited by examiner

*Primary Examiner* — Sarang Afzali
(74) *Attorney, Agent, or Firm* — James E. Walton; Richard G. Eldredge

(57) ABSTRACT

Method for configuring the constituent elements of hollow helical wheels or their cages, which is based on using geometrical figures whose centers serve as reference for constructing them and defining their areas. Values of angles, offsets of the centers, and pitches, make it possible to control all the constituent elements.

13 Claims, 1 Drawing Sheet

METHOD OF CONFIGURING HOLLOW HELICAL WHEELS AND THEIR CAGES

BACKGROUND

1. Field of the Invention

Hollow wheels and their hollow cages are devices which enable transfers of fluid, exploitation of the energy they contain, or use of the forces they exert.

2. Description of Related Art

The development of hollow wheels and their static cages has been slowed due to their very complex forms, which must be designed and adapted for each concerned application, and until now it was not possible to design them easily in quantity in order to be able to test and optimize them.

DETAILED DESCRIPTION OF THE PREFERRED EMBODIMENT

Figure 1:
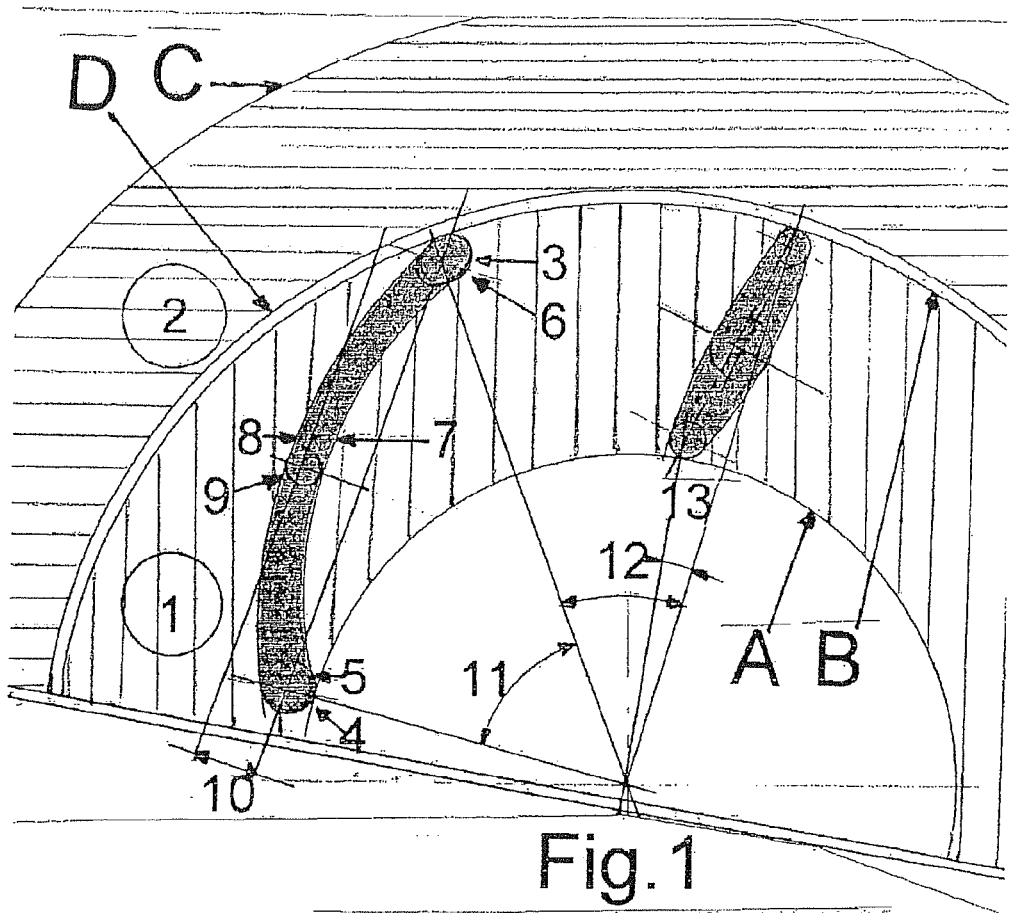
FIG. 1 illustrates a simplified cross-section portion of the surface of revolution swept by the inner and outer edges (A B) of a hollow helix (1), and (D C) of its static cage

Computer-aided design and manufacturing (CADM) offer new possibilities, and this tool is used here to amplify the innovative ideas which will make it possible to advance the knowledge of hollow wheels and their static cages.

This invention is the tool which makes it possible to create and design hollow wheels and their static cages very quickly by very easily changing all of their specific data so as to assist the acquisition of knowledge of these new products for the many concerned applications.

The complex evolutive forms of the multiple "constituent elements" of the structure of the hollow wheels and static cages are also called: vanes, blades, partitions, scoops, leaves, grates, valves, spacers, . . . and are all grouped here under the name "constituent elements".

This method for configuring hollow wheels (1) and their static cages (2) includes the following CADM (computer-aided design and manufacturing) steps:

It is first necessary to enter the fundamental configuration parameters offered: the traditional mechanical elements such as shafts, nozzles, bushings, bearings, supports, making it possible to incorporate the wheels and cages into their application setting, the dimensional values such as overall length, interior and exterior diameters, the quantity of each constituent element, it is also necessary to determine the directions of rotation chosen.

It is then necessary to enter the mathematical parameters corresponding to the known geometric shapes which will determine the exterior and interior revolution surfaces swept by the wheels, or those of the cages which contain the wheels, and the exterior shapes of the cages. They are preferably round, cylindrical, conical, ogival, elliptical, etc. in shape, formed alone or connected, Determination of the evolutive pitches of the helical constituent elements, which are defined either by conventional mathematical formula, or preferably through indication of at least two given values on specified points placed on the length of the hollow helical wheels (1) and their static cages (2) follows.

Several specific characteristics of this invention concern the new method of configuring profiles and other data, unique to each constituent element of helical or circular shape. At least one cross-section is used to define the profile of each element.

A first novelty consists of designing each leading and trailing edge (3 and 4) using portions of geometric figures which have a reference center (5 and 6), and then connecting them using portions of geometric figures which also have a reference center (7 and 8), and thereby defining the areas of the body of the evolutive constituent elements.

A second novelty consists of indicating an offset value of the position of the centers in order to obtain a hollow depth deformation (10), preferably concave or convex, of the body of the areas of the evolutive constituent elements.

A third novelty consists of indicating the thickness of the web of the constituent elements which is represented by a circle the center of which serves as a reference (9).

A fourth novelty consists of indicating an angular offset value (11) (13) between the centers of the interior leading or trailing edges, relative to the exterior leading or trailing edges of the constituent elements preferably making it possible to offset and couch the interior edges relative to the exterior edges.

A fifth novelty consists of indicating an angular offset value (12) between the centers of the leading or trailing edges, or interior and exterior edges, respectively, of the helical constituent elements so as preferably to make it possible to offset and position them relative to each other.

A sixth novelty consists of determining at least 2 pitch values for the helices, which are provided for at least two positions specified on the length of the wheel or the cage, and are then smoothed by the software.

The configured profiles are then displayed, enabling local visual checking.

In order to finish the concerned elements the cross-sections are then positioned on at least two points specified on the length of the wheel or the cage so that they are then smoothed by the software.

Figure 2:
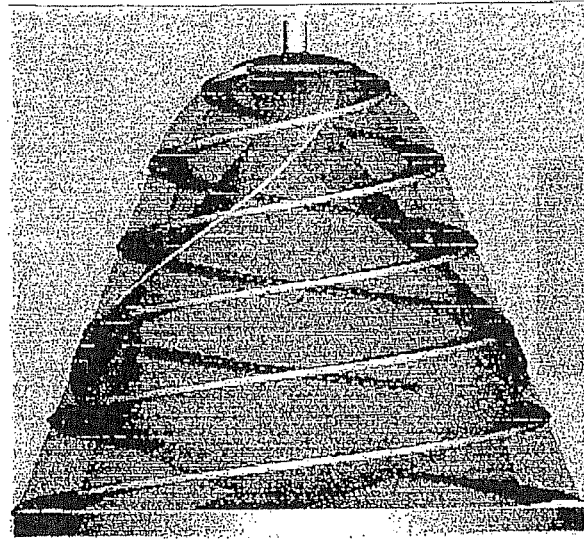
FIG. 2 shows a wheel realized according to the configuration principle described above.

The final display resulting from mixing of all of the helices and radial partitions with each other allows a final visual check (FIG. 2).

In case of dissatisfaction, it is possible to backtrack and correct the parameters in order to optimize the results.

A device for continuous checking of the compatibility of the values of the introduced parameters is integrated into the method in order to avoid aberrations.

Drawings are attached for information and non-limitingly, and the descriptions are voluntarily diagrammed in order to facilitate understanding of these complex forms.

The drawing FIG. 1 illustrates a simplified cross-section portion of the surface of revolution swept by the inner and outer edges (A B) of a hollow helix (1), and (D C) of its static cage The drawing illustrates a portion of cross-section of the wheel where the leading or trailing, exterior (3) and interior (4) edges of an element are shown flat. It shows the area of the body of the element which is delimited by one leading or trailing edge, finished by a circle portion (5), and by the other leading or trailing edge, which is finished by a diagonal rib portion (6). The drawing shows that the leading or trailing edges are connected to each other by two large circle portions which are tangent to them (7 and 8), thereby completely defining the area of the element. The drawing shows that the value given to the circle located in the middle of the element (9) makes it possible to define its thickness. The drawing shows that the given value for the offset of the aforementioned circle with the straight line connecting the centers of the leading and trailing edges (10) indicates the depth of the hollow of the element. The drawing shows the angular offset between the leading edges and the trailing edges (11). The drawing shows the angular offset given for two helices (12), preferably of different pitches, which then combine when the meet up in their journey.

The drawing FIG. 2 shows a wheel realized according to the configuration principle described above. The principle described according to the provided drawings is applied in the same way to static cages, casings and grates (2), and will therefore not be the subject of additional drawings.

A method for configuring hollow helical wheels, comprising: providing at least one evolutive helical element; forming a leading edge of the evolutive helical element in the shape of a portion of a first selected geometric figure having a first reference center; forming a trailing edge of the evolutive helical element in the shape of a portion of a second selected geometric figure having a second reference center; and forming a web between the leading edge and the trailing edge, the web having an interior surface and an opposing exterior surface, the interior surface being in the shape of a portion of a third selected geometric figure having a third reference center, and the exterior edge being in the shape of a portion of a fourth selected geometric figure having a fourth reference center; wherein the distance from a central axis to each reference center is selectively chosen so as to tailor the shape of the evolutive helical element.

The method, wherein the steps are carried out on a computer-aided design and manufacturing computer having a microprocessor, programmable software, memory, at least one input device, and a display having lighting elements, such that the lighting elements are transformed to display different images in response to selected changes input by a user to the geometric figures and the distances from the central axis to the reference centers.

The method, wherein the steps are carried out on a computer having a microprocessor, programmable software, memory, at least one input device, and a display having lighting elements, such that the lighting elements are transformed to display different images in response to selected inputs by a user to the shape of the geometric figures and the distances from the central axis to the reference centers.

The method, wherein the steps are carried out on a computer-aided design and manufacturing computer system having a microprocessor, programmable software, memory, at least one input device, and a display having lighting elements, such that the lighting elements are transformed to display different images in response to selected changes input by a user to the geometric figures and the distances from the central axis to the reference centers.

What is claimed is:

1. A method for configuring hollow helical wheels, comprising: providing at least one evolutive helical element; forming a leading edge of the evolutive helical element in the shape of a portion of a first selected geometric figure having a first reference center; forming a trailing edge of the evolutive helical element in the shape of a portion of a second selected geometric figure having a second reference center; and forming a web between the leading edge and the trailing edge, the web having an interior surface and an opposing exterior surface, the interior surface being in the shape of a portion of a third selected geometric figure having a third reference center, and the exterior edge being in the shape of a portion of a fourth selected geometric figure having a fourth reference center; wherein the distance from a central axis to each reference center is selectively chosen so as to tailor the shape of the evolutive helical element.

2. The method according to claim 1, further comprising: providing at least one additional evolutive helical element, each additional evolutive helical element having a different pitch.

3. The method according to claim 2, further comprising: selectively angularly offsetting the first reference center of one evolutive helical element from the first reference center of an adjacent helical evolutive element, thereby positioning the interior surface of the one helical evolutive element relative to the exterior surface of the adjacent helical evolutive element.

4. The method according to claim 3, wherein the steps are carried out on a computer having a microprocessor, programmable software, memory, at least one input device, and a display having lighting elements, such that the lighting elements are transformed to display different images in response to selected inputs by a user to the shape of the geometric figures and the distances from the central axis to the reference centers.

5. The method according to claim 2, further comprising: selectively angularly offsetting the second reference center of one evolutive helical element from the second reference center of an adjacent helical evolutive element, thereby positioning the interior surface of the one helical evolutive element relative to the exterior surface of the adjacent helical evolutive element.

6. The method according to claim 5, wherein the steps are carried out on a computer-aided design and manufacturing computer system having a microprocessor, programmable software, memory, at least one input device, and a display having lighting elements, such that the lighting elements are transformed to display different images in response to selected changes input by a user to the geometric figures and the distances from the central axis to the reference centers.

7. The method according to claim 2, further comprising: selectively angularly offsetting the first reference center from the second reference center for each evolutive helical element, thereby positioning the interior surface of one helical evolutive element relative to the exterior surface of an adjacent helical evolutive element.

8. The method according to claim 1, wherein the thickness of the web is determined by a circle having a selected diameter, the circle having a fifth reference center; and wherein the distance from the central axis to the fifth reference center is selectively chosen, so as to further tailor the shape of the evolutive helical element.

9. The method according to claim 8, further comprising: determining an offset value for the position of the first, second, and fifth reference centers, so as to form a hollow depth deformation of the evolutive helical element.

10. The method according to claim 9, wherein the offset value is chosen, such that the hollow depth deformation of the evolutive helical element is concave.

11. The method according to claim 9, wherein the offset value is chosen, such that the hollow depth deformation of the evolutive helical element is convex.

12. The method according to claim 1, further comprising: forming a static cage around the evolutive helical element.

13. The method according to claim 1, wherein the steps are carried out on a computer-aided design and manufacturing computer having a microprocessor, programmable software, memory, at least one input device, and a display having lighting elements, such that the lighting elements are transformed to display different images in response to selected changes input by a user to the geometric figures and the distances from the central axis to the reference centers.

* * * * *